July 9, 1963

H. FISCHER 3,097,330

COAXIAL CAPACITANCE TERMINATION

Filed March 28, 1958

3 Sheets—Sheet 1

INVENTOR.
HEINZ FISCHER

BY
ATTORNEYS

July 9, 1963   H. FISCHER   3,097,330
COAXIAL CAPACITANCE TERMINATION
Filed March 28, 1958   3 Sheets-Sheet 2

INVENTOR.
HEINZ FISCHER
BY
ATTORNEYS

July 9, 1963 H. FISCHER 3,097,330
COAXIAL CAPACITANCE TERMINATION

Filed March 28, 1958 3 Sheets-Sheet 3

INVENTOR.
HEINZ FISCHER
BY
ATTORNEYS

3,097,330
Patented July 9, 1963

3,097,330
COAXIAL CAPACITANCE TERMINATION
Heinz Fischer, 32 Scott Road, Belmont, Mass.
Filed Mar. 28, 1958, Ser. No. 724,775
2 Claims. (Cl. 317—242)
(Granted under Title 35, U.S. Code (1952), sec. 266)

The invention described herein may be manufactured and used by or for the United States Government for governmental purposes without payment to me of any royalty thereon.

This invention relates to capacitance circuitry, and particularly to circuitry involving capacitor assemblies wound about a central axis and electrically connected to current transfer elements in a manner to minimize the inductance factor of the capacitor assembly.

In such capacitance circuitry a disadvantage has been that even though the capacitor, per se, has a minimized inductance factor, the adjacent parts of the circuit, particularly the transmission members connecting the capacitor to its load, have the effect of adding considerably to the total inductance factor of the complete circuit. The present invention provides methods and means for minimizing this over-all inductance factor, in circuitry of the character indicated.

An object of the invention, therefore, is to provide novel methods and means for minimizing electric current flow-retarding inductance, in a capacitance-controlled electric circuit.

Figure 1:
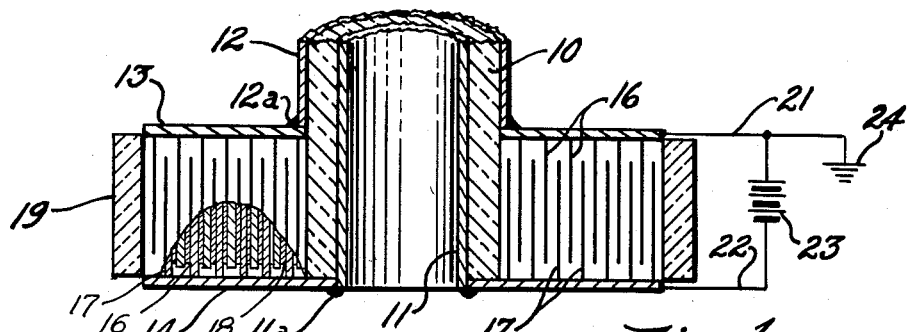
Figure 2:
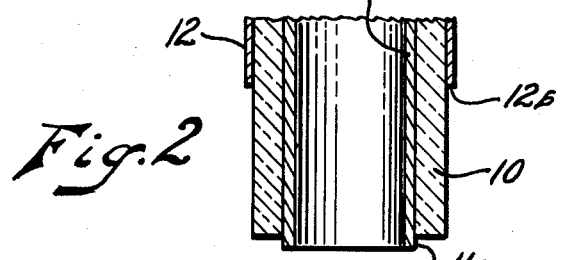
Figure 3:
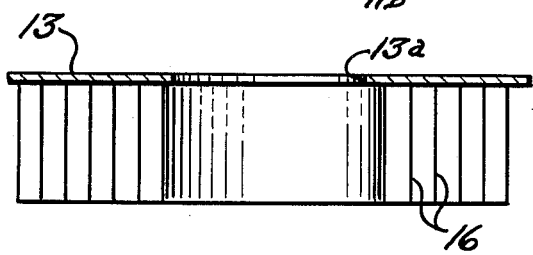
Figure 4:
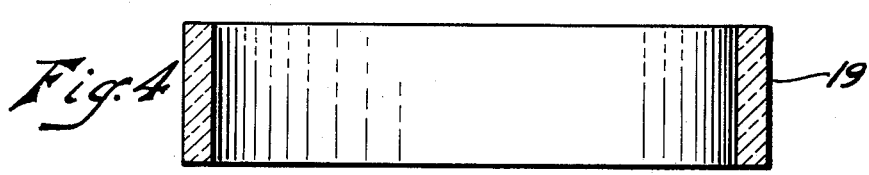
Figure 5:
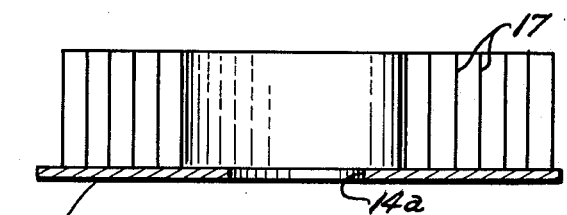
Figure 6:
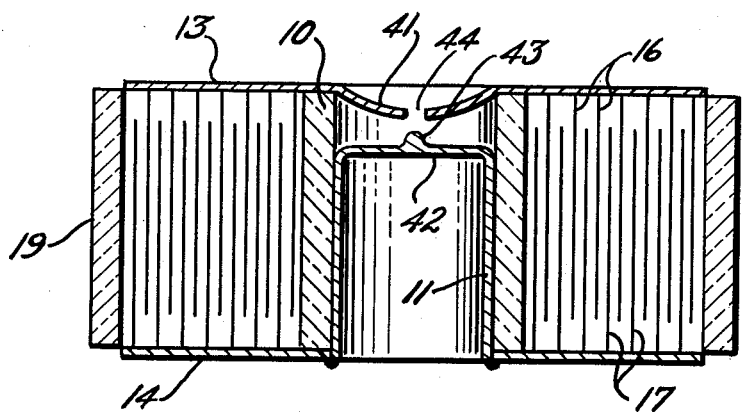
Figure 7:
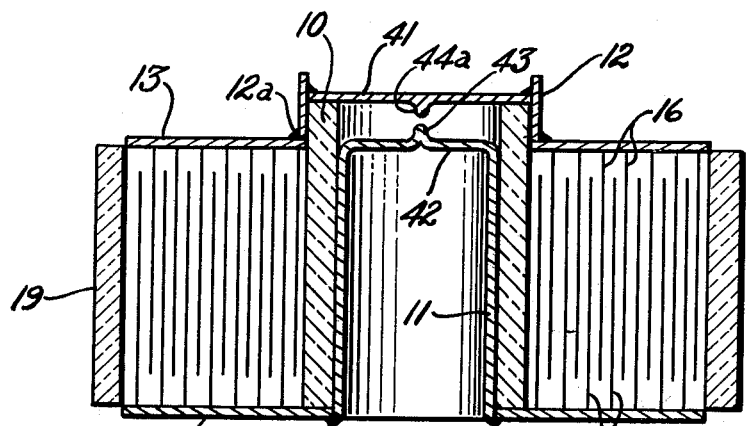
Figure 8:
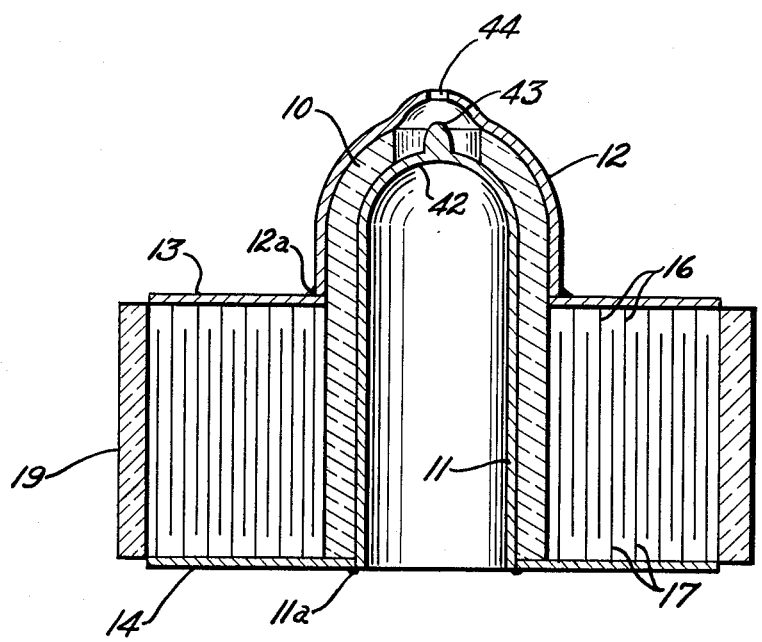

Other objects and characteristics of the invention will appear upon reference to the following description of several embodiments of the invention as illustrated in the accompanying drawings wherein:

FIG. 1 is an axial, sectional view of a capacitor assembly including circuit termination in the form of a coaxial line forming an integral part of said assembly, and coaxially related thereto, said assembly facilitating practice of the invention and constituting an embodiment thereof;

FIGS. 2 to 5, inclusive, are sectional views of the component parts constituting the assembly of FIG. 1; and FIGS. 6, 7, 8 are axial sectional views of other embodiments of the invention.

Referring first to FIGS. 1 to 5, inclusive, numeral 10 designates a tubular member of dielectric material (glass, ceramic, or plastic) and numerals 11 and 12 designate metal coatings plated or otherwise bonded to the tube 10, the outer coating 12 being of shorter length and electrically bonded at its lower end to a flat metallic disc 13, while coating 11 is electrically bonded at its lower end to a similar flat metallic disc 14, which discs 13 and 14 have secured thereto the upper and lower edges of alternate strips 16, 17 of metal foil that are spirally wound—along with an inter-leaving strip 18 of insulating material such as paper—about the uncoated portion of the outer periphery of tube 10 to form a capacitor assembly of the kind illustrated and described in greater detail in my Patent No. 2,728,877 entitled: "Apparatus for Obtaining Extremely High Temperatures." The completed assembly is enclosed in a protective sleeve 19 of dielectric material, and leads 21, 22 connect the discs 13, 14, respectively, with a high-voltage D.C. source 23, grounded as indicated at 24. The capacitor charging voltage is commonly about 50 kilovolts, but may be as high as requirements of the utilization apparatus dictate.

Because of the close intimacy and simplicity of the cooperating current-carrying elements, as illustrated in FIG. 1, the over-all inductance from the capacitor to the terminating coaxial conductors 11, 12 is extremely small, in favorable contrast to the relatively large inductance increment that accompanies the use of load-connecting transmission elements of the character heretofore common for this purpose. The inductance may be further minimized by judicious selection of optimum dimensions for elements 10, 11, and 12, which will vary somewhat for each different character of service to be performed. Also, the speed and directness of current transfer is enhanced by sealing discs 13 and 14 directly to the ends of conductors 11 and 12, respectively, as indicated at 11a and 12a in FIG. 1. To facilitate such sealing conductor 11 is preferably made to extend slightly below the bottom edge of insulator 10, as indicated at 11b in FIG. 2. The resulting exposed outer periphery of conductor 11 is thereafter sealed against the circular inner periphery 14a of disc 14, shown best in FIG. 5. The bottom edge 12b (FIG. 2) of outer conductor 12 is similarly sealed to the flat upper area 13a (FIG. 3) of upper disc 13.

If it is desired to discharge the capacitor into a coaxial spark gap, in accordance with the concept disclosed and claimed in my Patent No. 2,728,877, above referred to, the construction illustrated in either FIG. 6 or FIG. 7 will be effective for such function, particularly in that, here again, there is close intimacy and directness in the method of transferring current from the capacitor parts to the spark gap-defining electrode members 41 and 42, respectively, the former being an integral part of capacitor disc 13, and the latter (electrode 42) being an integral part of the capacitor disc 13, with a central area built up, as indicated at 43, to form one of the electrode terminals, the other being formed by perforating bowl 41 at its center, as indicated at 44 in FIG. 6, which perforation serves the additional function of facilitating observation of the sparking action and direction of the illumination therefrom, for use in infra-red signalling or analogous services. Alternatively, element 41 may carry a depending electrode tip 44a, as in FIG. 7.

Apparatus using the basic geometry of FIG. 6 has been built and studied for the purpose of (a) producing extremely large gas temperatures in the channel of the spark gap (over 250,000 degrees Kelvin); (b) as a very short-time high intensity pulse light source (brightness up to approximately $200 \times 10^6$ candles (cm.²). It turned out that the efficiency of the apparatus not only depended upon the inductance L, which could be reduced to values lower than $1 \times 10^{-8}$ henries, but also very strongly upon the contacts and conductivity of the circuit. This is due to the fact that the resistance of such gap may decrease to values in the order of $10^{-3}$ ohms. Thus, it is quite obvious that the resistance of the outer circuit determines the efficiency to a large extent.

In FIGS. 7 and 8 the elements 10 and 12 are extended axially, so that (in the case of FIG. 7) the spark formation across electrodes 43—44a may be visible through a lateral window (not shown), whereas in FIG. 8 it may be visible axially, as in FIG. 6. Soldered contacts, as shown at 11a and 12a, in FIG. 7, insure effective conductivity. The dome effect shown in FIG. 8 may be preferable to the purely cylindrical contour of FIG. 7.

The invention is particularly advantageous whenever extremely low inductance and extreme conductivity are required. It may be embodied in almost any size and voltage. Applications are pulse tubes with either extreme power or extreme short rise time, and pulse light sources of extreme brightness and short duration.

What I claim is:

1. In an electrical capacitor apparatus, the combination of a pair of concentric tubular conductors having parallel conducting flanges extending radially outward therefrom and a capacitor assembly surrounding the inner one of said conductors, an insulating material disposed about said inner conductor, said assembly including a sheet of dielectric material enclosed between two sheets of conductive material and spirally wound therewith about said insulating material on said inner tubular conductor, one of said conductive sheets having an edge secured to one of said flanges and the other of said conductive sheets having an edge secured to the other of said flanges to complete an electric circuit therethrough.

2. In an electrical capacitor apparatus, the combination of a substantially tubular spirally wound capacitor assembly comprising: first and second spirally wound conductive sheets having a dielectric material disposed therebetween, said assembly having a substantially cylindrical bore therethrough, a first plate secured to said first conductive sheet, a second plate secured to said second conductive sheet, a first tubular conductor having its terminus secured to said first plate, a tubular insulating member coaxially disposed within said first conductor and extending into said bore, a second tubular conductor coaxially disposed in said tubular insulating member and having its terminus secured to said second conductive sheet.

References Cited in the file of this patent

UNITED STATES PATENTS

| | | |
|---|---|---|
| 1,094,718 | Honold | Apr. 28, 1914 |
| 1,904,805 | Selling | Apr. 18, 1933 |
| 1,948,506 | Caine | Feb. 27, 1934 |
| 2,171,219 | Malter | Aug. 29, 1939 |
| 2,270,953 | Manz | Jan. 27, 1942 |
| 2,637,010 | Charske | Apr. 28, 1953 |
| 2,759,139 | Andrews | Aug. 14, 1956 |